(No Model.)

H. F. BEIMLING.
CENTRIFUGAL LIQUID SEPARATOR.

No. 487,943. Patented Dec. 13, 1892.

Witnesses:
R. Schleicher.
A. V. Groupe

Inventor:
Henry F. Beimling
by his Attorneys
Howson & Howson

UNITED STATES PATENT OFFICE.

HENRY F. BEIMLING, OF PHILADELPHIA, PENNSYLVANIA, ASSIGNOR TO JAMES BARKER, OF SAME PLACE.

CENTRIFUGAL LIQUID-SEPARATOR.

SPECIFICATION forming part of Letters Patent No. 487,943, dated December 13, 1892.

Application filed September 17, 1891. Serial No. 405,938. (No model.)

*To all whom it may concern:*

Be it known that I, HENRY F. BEIMLING, a citizen of the United States, and a resident of Philadelphia, Pennsylvania, have invented certain Improvements in Centrifugal Liquid-Separators, of which the following is a specification.

The object of my invention is to construct an improved centrifugal separator especially adapted for separating cream from milk, whereby the cream will be more quickly separated than heretofore, a greater percentage of cream will be separated, and the cream can be separated without first heating the milk.

Figure 1:
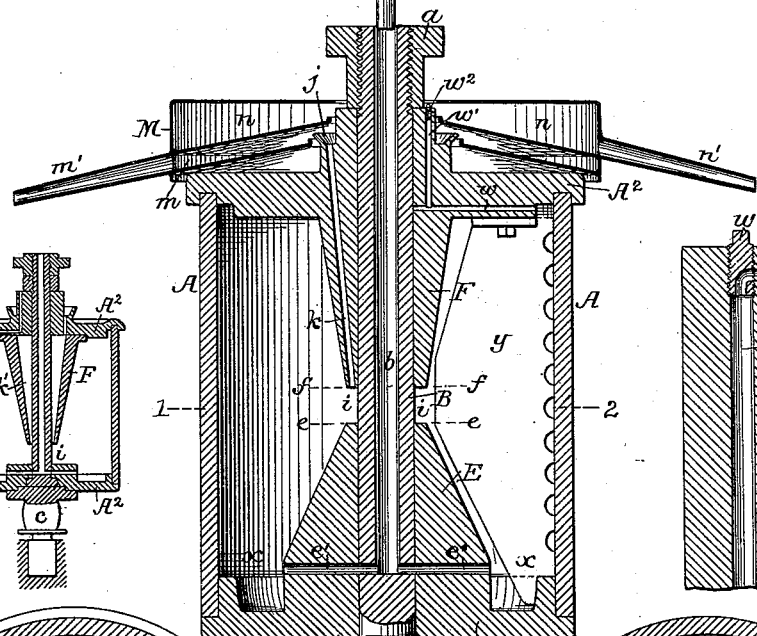
Figure 5:
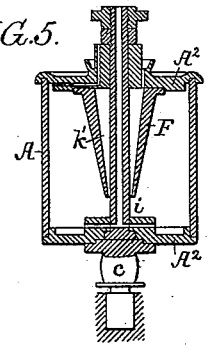
Figure 4:
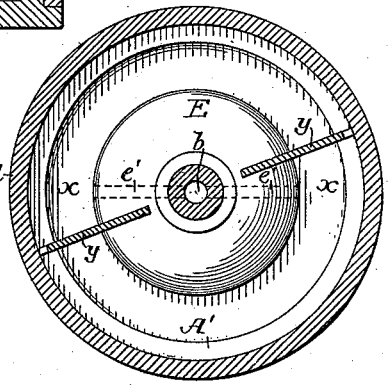
Figures 2, 3:
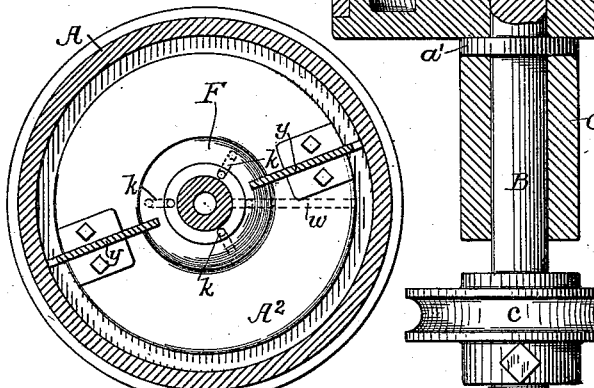

In the accompanying drawings, Figure 1 is a vertical sectional view of my improved separator. Fig. 2 is a section on the line 1 2, Fig. 1. Fig. 3 is an inverted sectional plan view on the line 1 2, Fig. 1. Fig. 4 is an enlarged view of the discharge-regulating valve, and Fig. 5 is a sectional view of a modified form of separator.

Referring to Fig. 1, A is the casing of the separator, having a base A' and a cap $A^2$, which are hermetically sealed to the casing A. B is the driving-shaft, which extends up through the base and cap, the portion above the base having a passage-way $b$, through which the milk passes to the separator. The shaft B is mounted in suitable bearings C C and is provided with a suitable driving-pulley $c$. It will be understood, however, that the casing can be revolved in any suitable manner without departing from my invention.

D is the reservoir for the milk to be separated, said reservoir having a pipe $d$, through which the milk passes to the passage $b$ in the shaft B, this pipe being provided with a suitable valve $d'$ for regulating the flow of milk to the passage $b$.

The upper portion of the shaft B is screw-threaded, and adapted to this screw-thread is a nut $a$, so that on screwing down this nut the shell A and the base and cap are clamped between a flange $a'$ on the shaft and the nut, the parts being thus held rigidly together; but it will be understood that this special construction need not be adhered to in all cases.

Extending up from the base A' is a cone E, which extends to or about the line $e\ e$, and is less in diameter than the shell, thus forming the milk-chamber $x$. At the base of this cone are milk-passages $e'$, which communicate with the passage $b$.

Depending from the under side of the cap $A^2$ is a cone F, which terminates at or about the line $f\ f$, forming, with the lower cone E, an annular cream-space $i$. This cream-space need not necessarily be at the exact point shown, as it may be above or below the center of the separator, so long as it is at a point between the two cones. As the milk flows in through the central tube $b$ and the transverse passages $e'$ the heavy particles at once seek the periphery of the separator, forcing the pure cream back toward the center of rotation. Consequently the cream will be backed upon the cones E and F and will gradually work into the cream-space $i$. In order to carry away the cream as it accumulates in this space, I provide one or more cream-passages $k$ in the cone F, forming a communication between the cream-space $i$ and the outlet $j$, which in the present instance is in the form of an annular basin. The cream, as it accumulates in this basin, flows over the sides into the cream-compartment $m$ of the casing M, which is mounted above the separator, and is secured to any stationary portion of the machine. A spout $m'$ carries the cream away from the casing M into any suitable receptacle.

In the cap $A^2$ are one or more milk-passages $w$, communicating with the interior of the separator near the shell, as shown in Fig. 1, and also communicating with a passage $w'$, which has a suitable valve $w^2$, Fig. 4, which regulates the flow of milk from the separator. The valve $w^2$ has a right-angled passage, as shown in Fig. 4, and is in the shape of a screw-threaded plug, so that on turning the plug the area of the passage can be increased or diminished. The skimmed or separated milk as it accumulates in the separator-chamber $x$ passes out through the passages $w$ $w'$ to the skimmed-milk compartment $n$ in the casing N, a spout $n'$ carrying the skimmed milk off to a suitable receptacle.

It will be observed that the milk-inlet passages extend inwardly to the axis of rotation of the separator, while the passages for the escape of cream are some little distance from said axis. The tendency of the liquid contents of the separator is to seek the outer portion of the separator-chamber. Hence the cream would not escape from said chamber unless subjected to pressure. This pressure is provided for by the inward extension of the milk-inlet passages, for those portions of said passages which are between the axis of rotation and the line of the milk-discharge passages constitute a centrifugal pump for forcing the milk into the separator and maintaining it therein under sufficient pressure to cause the desired discharge through the cream-passages $k$ without the necessity of maintaining a hydrostatic column in the inlet-tube for the purpose of securing the needed pressure in the separator.

I find that in constructing a separator as above described it is not necessary to drive the same at as high a rate of speed as is usually necessary to thoroughly separate cream from milk, and, furthermore, that the milk to be separated need not be heated, as I have found by practical experiments that iced milk can be as readily separated as warm milk.

I so regulate the flow of milk from the reservoir D by adjusting the valve $d'$ that the level of milk will remain about the upper end of the passage $b$, the flow of milk through the separator being regulated by the valve $w^2$ in the skimmed-milk passage $w'$, and by this arrangement I am enabled to keep the separator-chamber always full. Consequently no air is allowed to gain access to the chamber, and a more even flow of cream and skimmed milk is assured, there being no foaming of the milk or cream as when the same is exposed to the air during separation.

Rotation of the contents of the separator is insured by the radial partitions or vanes $y$.

In Fig. 5 I have shown a modification of my invention, in which only the upper cone F is used and in which there is an annular cream-passage $k'$, the cone E in this case being dispensed with and the cream-passage $i$ being between an extension on the base and the lower line of the cone F.

It will be understood that the cone E can be used with or without the cone F; but I prefer to use the two cones where practicable, and the cones are so arranged that the cream-space $i$ alluded to above is at the apex of each cone and the axis of the cone is coincident with the axis of the cylinder.

Cream produced by my improved machine contains a large percentage of butter fats, and can be churned in much less time than usual, and the butter does not require the addition of potash or other salts to prevent it from becoming rancid.

Although I have described my improved separator as applied to the separation of cream from milk, it will be evident that the machine can be used for the separation of any liquids the component parts of which are of different specific gravities.

I claim as my invention—

1. The combination, in a centrifugal separator, of the casing having a skim-milk outlet communicating with the outer portion of the separating-chamber, mechanism for rotating said casing, a central cone having its axis coincident with the axis of the cylinder and having formed in it a cream-outlet communicating with the separating-chamber at or near the apex of the cone, and a milk-inlet extending inward beyond the cream-outlet, substantially as specified.

2. The combination, in a centrifugal separator, of the casing having a skim-milk outlet communicating with the outer portion of the separating-chamber, rotating mechanism for said casing, two reversed cones having their axes coincident with the axis of the cylinder, one of said cones also having a cream-outlet communicating with the separating-chamber at or near the apex of the cone, the central portion of the separator also having a milk-inlet extending inward beyond the cream-outlet, substantially as specified.

3. The combination, in a centrifugal separator, of the casing having formed therein a skim-milk outlet communicating with the outer portion of the separating-chamber, a central cone having its axis coincident with the axis of the cylinder and having formed in it a cream-outlet communicating with the separating-chamber at or near the apex of the cone, a central shaft carrying the casing and having formed in it a central milk-passage with radiating portions extending inward beyond the cream-outlet, and means for rotating said shaft, substantially as specified.

4. The combination, in a centrifugal separator, of the casing having therein a milk-outlet communicating with the outer portion of the separating-chamber, a central cone having its axis coincident with the axis of the cylinder and having formed in it a cream-outlet communicating with the separating-chamber at or near the apex of the cone, receivers for the discharged milk and cream, an axial shaft having formed in it a central milk-passage with radiating portions extending inward beyond the cream-outlet, and a valve for governing the flow of skim-milk from the separator, substantially as specified.

5. The combination, in a centrifugal separator, of the casing having formed therein a skim-milk outlet communicating with the outer portion of the separating-chamber, a central shaft having a milk-inlet passage formed therein, a collar on said shaft serving as a support for the base of the cylinder, a nut on the shaft for confining the cap of the cylinder, and a central cone located within the cylinder and having its axis coincident with the axis of said cylinder, said cone having formed in it a cream-outlet which communicates with the separating-chamber at or near the apex of the cone, substantially as specified.

In testimony whereof I have signed my name to this specification in the presence of two subscribing witnesses.

HENRY F. BEIMLING.

Witnesses:
EUGENE ELTERICH,
HARRY SMITH.